3,210,250
HEPARINE DERIVATIVES AND METHOD
OF MAKING SAME
Robert Bucourt, Clichy-sous-Bois, Seine et Oise, France, assignor to Roussel-UCLAF, Paris, France, a corporation of France
No Drawing. Filed Jan. 16, 1964, Ser. No. 338,010
Claims priority, application France, Jan. 18, 1963, 921,873
9 Claims. (Cl. 167—74)

The invention relates to the novel compound, benzyl heparinate and its alkali metal salts and to a novel process for its preparation. The invention further relates to novel anticoagulating compositions having an elevated antilipemic and clarifying activity and to a novel method of retarding the coagulation of blood.

It is an object of the invention to provide the novel compound, benzyl heparinate and its alkali metal salts.

It is another object of the invention to provide a novel process for the preparation of benzyl heparinate and its alkali metal salts.

It is a further object of the invention to provide novel anticoagulating compositions which have an elevated antilipemic and clarifying action.

It is an additional object of the invention to provide a novel method of retarding coagulation of blood.

These and other objects and advantages of the invention will become obvious from the following detailed description.

The novel compound of the invention is benzyl heparinate and its alkali metal salts which has the probable structural formula

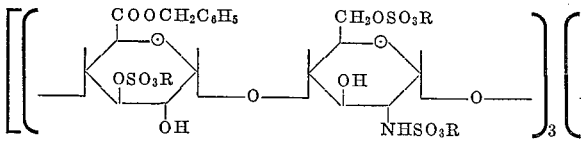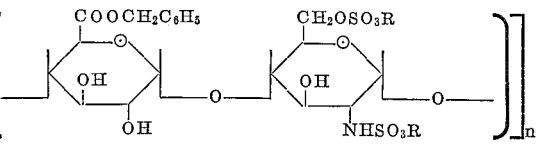

wherein R is selected from the group consisting of hydrogen and an alkali metal.

Some derivatives of heparine which possess prolonged anticoagulating activity are known. Benzyl heparinate and its alkali metal salts, however, possess a prolonged anticoagulating activity which is marked at relatively low doses and also possess an elevated antilipemic and clarifying activity.

The process for the preparation of an alkali metal salt of benzyl heparinate comprises reacting a benzyl halogenide with a high molecular weight long chain quaternary ammonium salt of heparine in an inert organic solvent to form the corresponding quaternary ammonium salt of benzyl heparinate which is reacted with an alkali metal salt of a lower alkanoic acid to form the corresponding alkali metal salt of benzyl heparinate.

The process for the preparation of benzyl heparinate comprises reacting a benzyl halogenide with a high molecular weight long chain quaternary ammonium salt of heparine in an inert organic solvent to form the corresponding quaternary ammonium salt of benzyl heparinate, which is reacted with an alkali metal salt of a lower alkanoic acid to form the corresponding alkali metal salt of benzyl heparinate, the aqueous solution of which is treated by an acid ion exchange resin to form benzyl heparinate.

The high molecular weight long chain quaternary ammonium compounds used to form the corresponding salt of heparine are such as, for example, benzyldimethyl 2 - [2 - (p - 1, 1, 3, 3-tetramethyl-butyl-phenoxy)-ethoxy]-ethyl ammonium chloride, which is also known under the trademark "Hyamine 1622" trimethyl (methyldodecylbenzyl)-ammonium chloride dilauryldimethylammonium chloride and other suitable compounds.

A preferred mode of the process of the invention comprises reacting benzyl bromide with the Hyamine 1622 salt of heparine in tetrahydrofuran to form the Hyamine 1622 salt of benzyl heparinate and reacting the latter with an aqueous solution of sodium acetate to form the sodium salt of benzyl heparinate which can be precipitated from solution by the addition of a lower alkanol such as methanol. Other alkali metal salts such as the potassium salt can be formed by using the potassium salt of lower alkanoic acids in place of sodium acetate.

As has already been indicated above, benzyl heparinate and its alkali metal salts possess particularly the advantage over heparine of exercising a prolonged action which avoids repeated intravenous injections or continuous venous perfusions required with very elevated doses of heparine. It possesses, in addition, the advantage over anticoagulants derived from dicoumarine of acting with rapidity and during an easily determinable delay, whereas the derivatives of dicoumarine which inhibit the synthesis of thrombine in the liver (antagonists of vitamin K) have a delaying action but whose duration cannot be foreseen with certitude. Finally, for aught we know, the action of benzyl heparinate and its alkali metal salts is manifest on all the stages of coagulation. This renders their action more sure and less dangerous for the organism.

The novel anticoagulating compositions of the invention which possess an elevated antilipemic and clarifying activity are comprised of a compound selected from the group consisting of benzyl heparinate and its alkali metal salts and a major amount of a pharmaceutical carrier. The said compositions may be in the form of aqueous injectable solutions and suppositories prepared in the usual manner.

The novel method of the invention of retarding the coagulation of blood comprises administering an effective amount of a compound selected from the group consisting of benzyl heparinate and its alkali metal salts. The compounds may be administered transcutaneously by intramuscular, subcutaneous or intravenous injections or rectally. The usual daily dosage is 100 to 600 mg. per day depending upon the method of administration.

In the following example there are described several preferred embodiments to illustrate the invention. However, it should be understood that the invention is not intended to be limited to the specific embodiments.

*Example I.—Preparation of the sodium salt of benzyl heparinate*

11 grams of the neutral heparine salt of Hyamine 1622 (obtained according to the United States Patent No.

2,989,438) and 110 cc. of tetrahydrofuran were introduced into a three-necked balloon flask and the mixture was agitated until total dissolution occurred. Thereafter, 55 cc. of benzyl bromide were added and the mixture was agitated and the tetrahydrofuran was distilled therefrom. Precipitation was brought about by the addition of 400 cc. of methanol. The benzyl heparinate was separated by filtration, vacuum filtered and washed with methanol. The precipitate was taken up with 80 cc. of an aqueous solution containing 20% sodium acetate and 300 cc. of methanol were added thereto. The benzyl heparinate precipitated therefrom in the form of its sodium salt. The precipitate was vacuum filtered and washed with methanol. The precipitate was then redissolved in water and filtered through carbon black and infusorial earth. The filtrate was poured into a mixture of 450 cc. of methanol and 50 cc. of a methanolic solution of sodium acetate. The precipitate was separated, vacuum filtered, washed with methanol and dried to obtain 2.993 gm. of benzyl heparinate in the form of its sodium salt. The product occurred in the form of an amorphous powder of white color, and was soluble in water, very slightly soluble in alcohol and insoluble in ether, acetone, benzene and chloroform. Its specific rotation $[\alpha]_D^{20} = +33.3° \pm 0.5°$ (c.=1% in water).

Analysis.—Raw formula, $[C_{76}H_{89}O_{73}N_4S_{11}Na_{11}]_n$: molecular weight=$(2832.23)_n$. Calculated: C, 32.22%; H, 3.16%; N, 1.97%; ash, 27.5. Found: C, 32.3–32.1%, H, 3.3–3.3%; N, 1.8–1.9%; ash, 27.5–27.5.

U.V. spectra:

$\lambda max. = 251$ m$\mu$ $E_{1cm.}^{1\%} = 3.76$ $\lambda max. = 257$ m$\mu$ $E_{1cm.}^{1\%} = 4.14$ $\lambda max. = 262$ m$\mu$ $E_{1cm.}^{1\%} = 3.67$ $\lambda max. = 267$ m$\mu$ $E_{1cm.}^{1\%} = 2.53$ These results correspond approximately to benzyl groups about $2.2 \times 10^{-3}$ molecules per gram. The product had an anticoagulant activity in vitro of 22 U/mg. and an antilipemic activity in vitro of 128 U/mg.

This compound is not described in the literature.

*Pharmacological study of benzyl heparinate and its alkali metal salts*

(1) *Immediate anticoagulant activity "in vitro."*—A plasma reactant deprived of calcium and of prothrombine was prepared. By adding thrombine to this plasma, the fibrinogen which it contained was transformed into fibrin which produced simultaneously a coagulation and an opacification. The previous addition of an anticoagulant such as heparine provokes a retardation of the coagulation and of the opacification. If the time necessary in order to obtain a given value of opacity is measured, it can be observed that there exists a relation between this time and the coagulating activity of the preparation. The values obtained are reported as those found with a solution titrated with heparine as the control. These values are expressed in antithrombic units (U.A.T.).

RESULTS

|  | U.A.T./mg. |
|---|---|
| Heparine control (sodium salt) | 130–140 |
| The sodium salt of benzyl heparinate | 22 |

(2) *Delayed anticoagulant activity in vivo by intravenous method.*—This action was studied in the rabbit by determining the time of coagulation at regular intervals (2, 4, 6, 8, 10 hours after intravenous injection of the compound studied). The compound was administered at doses of 10 mg./kg. and 20 mg./kg. The following results were obtained.

| Compound Administered | Anticoagulant Activity | | | |
|---|---|---|---|---|
| | 10 mg./kg. | | 20 mg./kg. | |
| | Number of U./kg. | Duration of action, hrs. | Number of U./kg. | Duration of action, hrs. |
| Heparine (sodium salt) | 1,300 | 4 | 2,600 | 6–7 |
| Sodium salt of benzyl heparinate | 220 | 2–3 | 440 | 7–8 |

As can be seen from the examination of this table, the sodium salt of benzyl heparinate possesses a prolonged anticoagulant action at anticoagulant doses (expressed in units) much lower than those of heparine necessary to obtain an effect of the same order.

(3) *Clarifying activity in vitro.*—This activity was studied by utilizing the technique published by Plotka et al. (Arch. Int. Pharmacodyn, 1960, 126, 140). After having verified on several samples of heparine that the variation of anticoagulant and antilipemic values were always parallel, a heparine testing 150 anticoagulant units per mg. was taken as a reference standard to which the value of 150 clarifying or antilipemic units was arbitrarily assigned to determine the antilipemic activity of the sodium salt of benzyl heparinate in antilipemic units. To this effect the variations of turbidity caused by the action of increasing doses of standard heparine were measured in the presence of $CaCl_2$ on the same volume of the artificial substrate of egg yellow. In certain limits of concentrations of heparine, the graphic representation was a straight line. The test was repeated on the sodium salt of benzyl heparinate and with reference to the graph of the reference compound, the value in antilipemic units (A.L.) of the sample was found to be 128 U./mg.

(4) *Determination of toxicity.*—The sodium salt of benzyl heparinate placed in solution in physiological serum was administered to lots of ten mice of the Rockland strain weighing between 18 and 22 gm. The medicine was injected intravenously in a volume of 10 cc. per kg. of animal at doses of 100 mg./kg. and 200 mg./kg.

The animals were held under observation for a period of one week. At a dose of 200 mg./kg., four mice out of ten died. No mortality was noted at a dose of 100 mg./kg. Therefore, the sodium salt of benzyl heparinate in acute testing on mice at a dose of 100 mg./kg. administered intravenously is devoid of toxicity.

Various modifications of the compositions and process of the invention may be made without departing from the spirit or scope thereof and it is to be understood that the invention is to be limited only as defined in the appended claims.

I claim:
1. A compound selected from the group consisting of benzyl heparinate and its alkali metal salts.
2. Benzyl heparinate.
3. The sodium salt of benzyl heparinate.
4. A process for the preparation of an alkali metal salt of benzyl heparinate which comprises reacting a benzyl halogenide with a high molecular weight quaternary ammonium salt of heparine in an inert organic solvent to form the corresponding quaternary ammonium salt of benzyl heparinate which is reacted with an alkali metal salt of a lower alkanoic acid to form the corresponding alkali metal salt of benzyl heparinate.
5. The process of claim 4 wherein the benzyl halogenide is benzyl bromide.
6. A process for the preparation of the sodium salt of benzyl heparinate which comprises reacting benzyl bromide with a high molecular weight quaternary am- monium salt of heparine in an inert solvent to form the corresponding quaternary ammonium salt of benzyl heparinate and reacting the latter with an aqueous solution of a sodium salt of a lower alkanoic acid to form the sodium salt of benzyl heparinate.

7. A process for the preparation of benzyl heparinate, which comprises reacting a benzyl halogenide with a high molecular weight quaternary ammonium salt of heparine in an inert organic solvent to form the corresponding quaternary ammonium salt of benzyl heparinate, which is reacted with an alkali metal salt of a lower alkanoic acid to form the corresponding alkali metal salt of benzyl heparinate, the aqueous solution of which is treated by an acid ion exchange resin to form benzyl heparinate.

8. An anticoagulant composition comprised of a compound selected from the group consisting of benzyl heparinate and its alkali metal salts and a major amount of a pharmaceutical carrier.

9. The composition of claim 8 wherein the said compound is the sodium salt of benzyl heparinate.

No references cited.

JULIAN S. LEVITT, *Primary Examiner.*